UNITED STATES PATENT OFFICE.

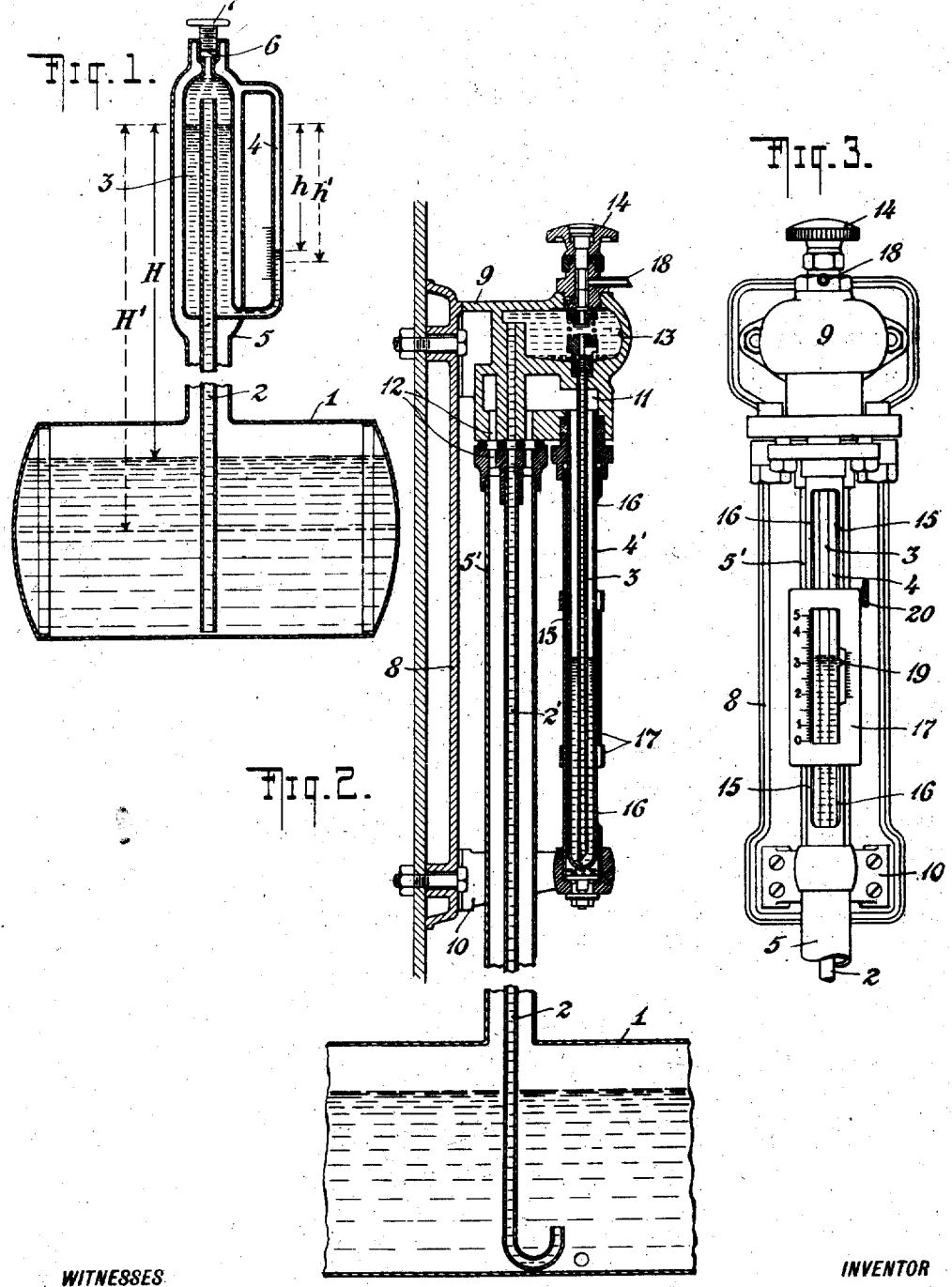

ERNST HURLBRINK, OF BERLIN-FRIEDENAU, GERMANY, ASSIGNOR TO MARTINI & HUNEKE MASCHINENBAU-AKTIEN-GESELLSCHAFT, OF BERLIN, GERMANY, A CORPORATION OF GERMANY.

APPARATUS FOR INDICATING THE LEVEL OF LIQUIDS UNDER PRESSURE.

1,256,904.    Specification of Letters Patent.    Patented Feb. 19, 1918.

Application filed May 8, 1915.  Serial No. 26,689.

*To all whom it may concern:*

Be it known that I, ERNST HURLBRINK, a citizen of the German Empire, and resident of Berlin-Friedenau, Germany, have invented certain new and useful Improvements in Apparatus for Indicating the Level of Liquids Under Pressure, of which the following is a specification.

My invention relates to improvements in apparatus for indicating the level of liquids under pressure, and more particularly to apparatus located above the vessel containing the liquid, which is the case for example in apparatus used in connection with vessels containing inflammable liquids and located under ground. The object of the improvements is to provide an apparatus of this class in which it is not necessary to provide an indicating liquid which in apparatus of the present construction must be provided above the column of mercury. With this object in view my invention consists in constructing the apparatus in such a way that the mercury has the function of the indicating liquid, for which purpose it is provided above the liquid and at the place where the indications are to be made and is connected with the liquid within the vessel through a pipe which is filled with liquid from the vessel.

With this and other objects in view my invention consists in the matters to be described hereinafter and particularly pointed out in the appended claims.

For the purpose of explaining the invention an example embodying the same has been shown in the accompanying drawing, in which the same letters of reference have been used in all the views to indicate corresponding parts. In said drawing—

Figure 1, is a diagrammatical view of the apparatus,

Fig. 2, is a vertical cross-section of the apparatus such as it is used in connection with vessels containing inflammable liquids, and Fig. 3, is a front view of the apparatus shown in Fig. 2.

Referring at first to the diagrammatical view shown in Fig. 1, the liquid to be measured is inclosed within a vessel 1 which is connected with a vertical pipe 2 extending through the top wall downward to a point near the bottom of the same. Above the vessel the measuring apparatus is located which consists of a container comprising two chambers 3 and 4 communicating with each other at their bottoms and arranged substantially in the form of the letter U. The said container is partly filled with mercury. The chamber 3 is closed at its top and it communicates with the vertical pipe 2 which extends through the bottom and to a point near the top of the chamber. The chamber 4 is in communication at its top with the top end of a pipe 5 which is connected with the vessel 1 at a point above the surface of the liquid contained therein, and which is disposed concentrically around the vertical pipe 2. The chamber 3 can be connected at its top with the atmosphere through an opening 6 which is normally closed in an air tight manner by a screw plug 7.

In order to put the apparatus to use, the screw plug 7 is first removed and pressure is applied to the vessel 1. Thereby the air or other gas inclosed within the pipe 2 and chamber 3 is removed by the liquid rising within the pipe 2, whereupon the screw plug is again screwed into closing position. Now the liquids within the chambers 3 and 4 of the container are set in such a way, that the difference of the levels between the surface of the liquid within the vessel 1 and the surface of the mercury within the chamber 3 and in contact with the liquid from the vessel on the one hand and the difference of the levels of the said surface of the mercury and the surface of the mercury within the chamber 4 on the other hand, are inversely proportioned to the specific gravities of the liquid within the vessel and the mercury within the chambers 3 and 4. Therefore, the specific gravities of the liquid within the vessel 1 and the mercury being known, the difference of the levels of the mercury within the chambers indicates the level and the weight of the liquid within the vessel 1.

The principle of the new apparatus will be best understood from the following example: It may be assumed, that within the vessel there is a pressure of 1.5 atmospheres absolute. The difference H of the levels of the liquid within the vessel and the mercury within the chamber 3 be 13 meters. Under these circumstances the pressure at the surface of the mercury within the chamber 3 will be .2 atmospheres, because from the pressure of 1.5 atmospheres 1.3 atmospheres will be balanced by the weight of the column of liquid within the vertical pipe 2, the specific gravity of the liquid within the vessel being assumed to be 1. Therefore the pressure of 1.5 atmospheres which acts on the surface of the mercury within the chamber 4 must be reduced by the counter pressure of .2 atmospheres which acts on the surface of the mercury within the communicating chamber 3, so that only a pressure of 1.3 atmospheres must be balanced by the indicating liquid. This pressure corresponds exactly to the height of the column of liquid within the pipe 2 and is represented according to the specific gravity of the mercury which is 13 by a difference of the level of the surfaces of the mercury of 1 meter.

If the level of the liquid within the vessel 1 is changed by sinking one meter, as has been indicated by the dotted lines, the height of the column of liquid within the pipe 2 which must be balanced is increased one meter. The pressure at the place where the indicating liquid and the liquid from the vessel are in contact with each other falls from .2 atmospheres absolute to .1 atmosphere. By reason of this reduced pressure, from the gas pressure above the surface of the mercury within the chamber 4 not 1.3 atmospheres, as before, but 1.4 atmospheres are effective, so that the difference of the levels of the column of mercury is increased from $h$ to $h'$, that is 1.08 meter, which difference is determined in the communicating chambers by mercury flowing into the chamber 3.

In Figs. 2 and 3 I have shown a practical embodiment of the invention, which is particularly suitable for use in connection with vessels containing inflammable liquids, and which for this reason is provided with safety devices. As shown, on a plate 8 a container 9 and a bracket 10 are mounted, and the container is formed with two chambers 11 and 13. The lower chamber communicates through holes 12 with a pipe 5' which is connected to the vessel 1 containing the liquid above the surface of the latter and is provided with a diffusion closure and ball valve. The vessel is not shown in Fig. 3. Concentrically of the pipe 5' and within the latter a vertical pipe 2' is located, which is connected at its top with the upper chamber 13 of the container and is passed at its lower end through the wall of the vessel and to a point near the bottom thereof. The upper chamber 13 is normally closed by means of a valve 14 which is provided in lieu of the screw plug 7 shown in Fig. 1. The lower chamber 11 is provided with a downward extension in the form of a pipe 4' which is closed at its bottom where it is supported on the bracket 10, and the upper chamber is likewise provided with a downward extension in the form of a pipe 3' which is located concentrically within the pipe 4' and extends to a point near the bottom end of the said pipe where it communicates with the latter. The pipe 3' and the communicating pipe 4' contain a suitable amount of mercury. The pipe 4' is inclosed by a metal sleeve 15 which is provided with a slot or peep hole 16, and on which a slide 17 containing scale marks is shiftable.

From the valve chamber 14 a pipe 18 is branched off through which the gas within the chamber 13 may be blown off, and to which a suction pump may be connected for drawing the gas from the said chamber and causing the liquid to rise from the vessel 1 upward and into the pipe 2. Preferably the valve is constructed in such a way, that it is normally held on its seat by a spring.

The cross-section of the chamber 13 is large as compared to that of the pipe 4', so that a displacement of the mercury within the pipe 3' caused by a change in the level of the liquid within the vessel 1 causes a noticeable change of the level of the mercury only within the pipe 4', while the level of the mercury within the chamber 13 is not changed in a material degree. Thereby the accuracy of the measurement of the level within the vessel 1 is increased. The pipe 2' communicates with the chamber 13 at a point near the top thereof, so that in no position of the mercury can the parts of the latter flow into the said pipe, the size of the chamber 13 being sufficient to contain the whole amount of mercury, and when the whole amount of mercury is within the said chamber, the gas from the pipe 4' can rise through the pipe 3' upward and to the upper end of the pipe 2'.

The cross-section of the pipe 3' is small as compared to that of the pipe 4', in order that the amount of mercury which is necessary in the apparatus be as small as possible. By constructing the pipe 4' with a large cross-section the further advantage is obtained, that in case the apparatus is used in connection with inflammable liquids under pressure the protecting gas provided within the vessel to prevent ignition can rapidly blow off, if the pipe 4' breaks. For the same reason the construction of the pipe 5' with a large cross-section is preferable, through which the said gas can rapidly blow off in case the said pipe should break, in which case no liquid can be withdrawn from the vessel 1.

Furthermore I have found it convenient to construct the pipe 2' with an upturned bottom end and in the form of the letter U and to dispose the same within the vessel 1 in such a way, that the upturned inlet end is slightly above the tap hole of the vessel 1. In the operation of the apparatus from the inflammable liquid, water is gradually separated which is deposited at the bottom of the vessel, and when the vessel is being emptied through the tap hole the said water is withdrawn down to the level of the tap hole. Therefore the water which is gathered in the meantime cannot rise so far that it enters the vertical pipe 2 and causes errors in the indications of the apparatus.

At one side the scale 17 is provided with marks which show the level of the inflammable liquid within the vessel, and at the opposite side of the slot I prefer to provide marks representing the specific gravities of various liquids, which might be filled into the vessel 1. The difference of the levels of the column of mercury depends on the specific gravity of the liquid. Therefore the length and the position of the scale must be different for different liquids. In most cases the differences of the lengths of the scales are very small and can be neglected for practical purposes. But it is necessary to change the position according to the different specific gravities. For this reason the scale can be adjusted according to the scale marks indicated at the right hand side of the slot (in Fig. 3) and a fixed mark 19. For fixing the scale in set position a set screw 20 is provided.

The apparatus shown in Figs. 2 and 3 is put to use in a similar way as has been described with reference to Fig. 1. All the conditions of the levels of the liquids correspond to those of the example described with reference to Fig. 1.

From the foregoing description of the apparatus it will be understood, that the vertical pipe 2 or 2' will always be filled by the pressure within the vessel, so that at the part where the liquid from the vessel and the mercury are in contact with each other, that is at the level of the mercury within the chamber 3 or 13, there will be a pressure which is equal to the pressure within the vessel 1 minus the pressure caused by the weight of the column of liquid within the vertical pipe 2 or 2', which together with the gas pressure on the surface of the mercury within the pipe 4 or 4' sets the mercury within the chambers 3 and 4 or 3' and 4' according to the specific gravities of the liquids. If the level of the liquid within the vessel is changed, the pressure at the point of contact of the mercury within the chamber 3 and the liquid from the vessel 1 is changed accordingly, so that the difference of the levels of the mercury within the chambers 3 and 4 is changed accordingly.

While in describing the invention reference has been made to an example in which the liquid within the vessel is under high pressure, I wish it to be understood, that my invention is not limited to this feature. Where the liquid is not under pressure I use a suction pump in connection with the pipe 18 for drawing the liquid from the vessel 1 upward and into the pipe 2' and chamber 13. In this case the height of the apparatus above the vessel can not be higher, than the column of liquid which according to the specific gravity can be drawn upward by the suction of one atmosphere.

I claim herein as my invention:

1. In an apparatus of the class described, the combination with a vessel containing a liquid under pressure, of a container above the vessel having two chambers communicating with each other and containing a measuring liquid and connected with the vessel respectively above and below the surface of the liquid contained therein, means whereby the gas may be withdrawn from the chamber which communicates with the vessel below the surface of the liquid, whereby a column thereof is brought into direct contact with a surface of said measuring liquid, and means coöperating with said measuring liquid to indicate the difference of the levels of the measuring liquid.

2. In an apparatus of the class described, the combination with a vessel containing a liquid under pressure, of a container above the vessel having two concentrically arranged chambers communicating with each other at their bottoms and containing a measuring liquid, said chambers being connected with the vessel respectively above and below the surface of the liquid contained therein, and means coöperating with said measuring liquid to indicate the difference of the levels of the measuring liquid.

3. In an apparatus of the class described, the combination with a vessel containing a liquid under pressure, of a container above the vessel having two chambers communicating with each other at their bottoms and containing a measuring liquid and connected with the vessel respectively above and below the surface of the liquid contained therein, a shiftable scale for indicating the difference of the levels of the measuring liquid and provided with additional scale marks corresponding to the specific gravities of the liquids to be filled within the vessel and a fixed mark carried by said container and coöperating with said scale.

4. The combination of a vessel for a fluid under pressure, a conduit containing an indicating fluid, a connection from said conduit extending into the fluid in the vessel whereby the latter fluid is brought into contact with one surface of said indicating fluid and a second connection extending from said conduit to the vessel above the fluid therein whereby the other surface of said indicating fluid is directly subjected to the pressure in said vessel and serves as a means to indicate the level of the fluid therein.

5. The combination of a vessel for a fluid under pressure, a conduit containing an indicating fluid, a connection from said conduit to said vessel whereby one surface of said indicating fluid is under the influence of said pressure and indicates the level of the fluid in said vessel and another connection from said conduit extending into the fluid in the vessel and containing a column of the latter fluid, one end of which contacts with and bears directly upon the other surface of said indicating fluid to exert a pressure thereon counter to that of the pressure exerted on the first surface of said indicating fluid.

6. The combination of a vessel for a fluid under pressure, a conduit comprising two connected branches located at a distance above said vessel and containing an indicating fluid, a connection from one of said branches extending into the fluid and containing a column of the latter fluid one end of which contacts with and bears upon one surface of said indicating fluid, and a second connection from the free end of the other branch of said conduit to said vessel whereby the other surface of said indicating fluid is brought under the influence of said pressure and serves to indicate the level of the fluid in the vessel.

7. The combination of a vessel for a fluid, a conduit for an indicating fluid, a connection extending from said conduit into the fluid in said vessel and containing a column of the latter fluid, one end of which contacts directly with one surface of said indicating fluid and a second connection from said conduit to said vessel whereby the other surface of said indicating fluid is directly subjected to the pressure in said vessel, said second connection surrounding a portion of said first connection.

8. The combination of a vessel for a fluid, a U-shaped conduit containing an indicating fluid column and having one of its branches closed, a pipe extending into said closed branch through the indicating fluid therein and projecting into the fluid in said vessel whereby a column of the latter fluid is brought into direct contact with one end of said indicating fluid column and a connection from the free end of the other branch of said conduit to said vessel above the fluid therein whereby the other end of said indicating fluid column is directly subjected to the pressure in said vessel.

9. The combination of a vessel for a fluid having a withdrawal opening, a conduit for an indicating fluid connected with said vessel and whereby the level of the fuel therein is indicated and a connection from said conduit extending into the fluid in said vessel and having an upturned inner end extending upwardly above the withdrawal opening.

10. The combination of a vessel for a fluid, a conduit for an indicating fluid, a connection extending therefrom into the fluid in the vessel, a second connection from said conduit to said vessel above the fluid therein, a valve controlling the communication between said conduit and the atmosphere and a tube connected with the valve casing of said valve.

11. The combination of a vessel for a fluid under pressure, a conduit comprising a pair of members containing an indicating fluid column, the diameter of one of said members being relatively larger than that of the other member, a connection extending from one member into the fluid in the vessel and containing a column of the latter fluid, one end of which contacts directly with one end of said indicating fluid column, and a second connection from the other member to the vessel above the fluid therein whereby the other end of said indicating fluid column is directly subjected to the pressure within said vessel.

12. The combination of a vessel for a fluid under pressure, a tube closed at its lower end and adapted to contain a mercury column whereby the level of the fluid in the vessel is indicated, a connection from said tube to the vessel above the fluid therein whereby one end of said mercury column is directly subjected to the pressure within said vessel, a second tube of relatively small diameter dipping into said first tube and the mercury therein and a connection extending from said second tube into the fluid in said vessel, whereby a column of said latter fluid is brought into direct contact with the other end of said mercury column to oppose the action of the pressure within said vessel.

13. The combination of a vessel for a fluid under pressure, a conduit containing an indicating fluid column whereby the level of the fluid in said vessel is indicated, and a connection from said conduit to the vessel above the fluid therein, whereby one end of said column is subjected directly to the pressure within said vessel, said connection having a relatively large diameter whereby said pressure is quickly relieved if said connection is broken.

14. The combination of a vessel for a fluid under pressure, a conduit for an indicating fluid whereby the level of the fluid in said vessel is indicated, a scale adjustably mounted on said conduit and adapted to coöperate with said indicating fluid, said scale being provided with indications corresponding to the specific gravity of the different fluids adapted to be contained in said vessel and a relatively stationary indicator carried by said conduit whereby said scale may be set on said conduit.

15. The combination of a vessel for a fluid under pressure, indicating means located above said vessel and containing a mercury column having two upright legs the surfaces of which face in the same direction and one being in a higher plane than the other, and means for connecting said indicating means with said vessel, the difference between the level of the highest end surface of said mercury column and the level of the fluid in the vessel and the difference between the levels of the two end surfaces of the said column being always inversely proportional to the specific gravities of the fluid and said mercury.

In testimony whereof, I have signed this specification in the presence of two subscribing witnesses.

ERNST HURLBRINK.

Witnesses:
  WOLDEMAR HAUPT,
  HENRY HASPER.